US011285811B2

(12) United States Patent
Kimura et al.

(10) Patent No.: US 11,285,811 B2
(45) Date of Patent: Mar. 29, 2022

(54) VEHICLE DISPLAY DEVICE POINTER

(71) Applicant: Yazaki Corporation, Tokyo (JP)

(72) Inventors: Hiromichi Kimura, Shizuoka (JP);
Toshiki Kobayashi, Shizuoka (JP);
Mao Nakashima, Shizuoka (JP);
Akihiro Yatsuzuka, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 425 days.

(21) Appl. No.: 16/454,901

(22) Filed: Jun. 27, 2019

(65) Prior Publication Data
US 2020/0023737 A1 Jan. 23, 2020

(30) Foreign Application Priority Data

Jul. 18, 2018 (JP) .............................. JP2018-135025

(51) Int. Cl.
B60K 35/00 (2006.01)
G01D 13/22 (2006.01)

(52) U.S. Cl.
CPC ............. B60K 35/00 (2013.01); G01D 13/22 (2013.01); B60K 2370/27 (2019.05); B60K 2370/336 (2019.05); B60K 2370/6992 (2019.05)

(58) Field of Classification Search
CPC ................ B60K 35/00; B60K 2370/27; B60K 2370/336; B60K 2370/6992; B60K 37/02; G01D 13/22; G01D 11/28; G01D 13/265; G01D 13/28
See application file for complete search history.

(56) References Cited

U.S. PATENT DOCUMENTS

| 6,120,158 | A  | * | 9/2000 | Ishimaru | ................ | B60K 35/00 |
| | | | | | | 362/23.07 |
| 7,475,999 | B2 | * | 1/2009 | Mezouari | ............... | G01D 11/28 |
| | | | | | | 362/23.16 |
| 7,665,413 | B2 | * | 2/2010 | Birman | ................... | G01D 11/28 |
| | | | | | | 116/288 |
| 9,404,772 | B2 | * | 8/2016 | Sherman | .............. | G01D 13/265 |
| 9,995,606 | B2 | * | 6/2018 | Miyazawa | ................ | F21V 7/00 |

(Continued)

FOREIGN PATENT DOCUMENTS

EP 295165 A1 * 12/1988
EP 499536 A1 * 8/1992

(Continued)

Primary Examiner — Nimeshkumar D Patel
Assistant Examiner — Tania Courson
(74) Attorney, Agent, or Firm — Kenealy Vaidya LLP

(57) ABSTRACT

A vehicle display device pointer includes a translucent pointer that has a pointer main body disposed on a front side of a dial plate having a penetration hole and extending along the dial plate, a shaft protruding toward the penetration hole, and a light guide connecting the pointer main body and the shaft; a lightproof first shielding member that covers a proximal end portion of the pointer main body and the light guide from a front side and a lateral side; and a lightproof second shielding member that covers the proximal end portion of the pointer main body and the light guide from the back side. The pointer main body emits light by light emitted from a light source and incident on the shaft, and the second shielding member has protrusions that protrude toward the front side, and close gaps.

9 Claims, 15 Drawing Sheets

(56) References Cited

U.S. PATENT DOCUMENTS

| | | | |
|---|---|---|---|
| 10,054,470 B2* | 8/2018 | Harkins | G01D 13/04 |
| 10,584,985 B2* | 3/2020 | Mouard | G01D 11/28 |
| 10,859,414 B2* | 12/2020 | Xu | G01D 11/28 |
| 2015/0138751 A1* | 5/2015 | Sherman | G01D 13/265 |
| | | | 362/23.21 |
| 2017/0184428 A1 | 6/2017 | Mouard et al. | |

FOREIGN PATENT DOCUMENTS

| | | | | |
|---|---|---|---|---|
| EP | 3187834 A1 * | 7/2017 | | G01D 13/265 |
| EP | 3549807 A1 * | 10/2019 | | B60K 35/00 |
| JP | H6-31802 A | 2/1994 | | |
| JP | H08-69879 A | 3/1996 | | |
| JP | 2000-136952 A | 5/2000 | | |
| JP | 2006-162388 A | 6/2006 | | |
| JP | 2017-49176 A | 3/2017 | | |
| JP | 2019113447 A * | 7/2019 | | |

\* cited by examiner

VEHICLE DISPLAY DEVICE POINTER

CROSS-REFERENCE TO RELATED APPLICATION(S)

The present application claims priority to and incorporates by reference the entire contents of Japanese Patent Application No. 2018-135025 filed in Japan on Jul. 18, 2018.

BACKGROUND OF THE INVENTION

1. Field of the Invention

The present invention relates to a vehicle display device pointer.

2. Description of the Related Art

In related art, there is a technique of a light emission indicator. Japanese Patent Application Laid-open No. 2017-049176 discloses a light emission pointer that includes a rotary base having a light-receiving unit for receiving light from a light source, a light-transmitting member having an elongated indication unit illuminated by light from the light-receiving unit, and a cover member having a first cover unit for covering the circumference of the rotary base and a second cover unit having a viewing window for making a front face of the indication unit visible and covering the indication unit. The cover member of Japanese Patent Application Laid-open No. 2017-049176 has a light-shielding unit for shielding light leaking to a back side of the indication unit among the light proceeding from the rotary base toward the indication unit, at a location where the first cover unit and the second cover unit are connected.

When a dial plate is disposed on the back side of the pointer, it is desirable to be able to suppress light leakage to the dial plate. As long as the light leakage to the dial plate can be suppressed, the visibility of the pointer can be improved or the design of the pointer can be improved.

SUMMARY OF THE INVENTION

An object of the present invention is to provide a vehicle display device pointer capable of suppressing light leakage to the dial plate.

In order to achieve the above mentioned object, a vehicle display device pointer according to one aspect of the present invention includes a translucent pointer that has a pointer main body disposed on a front side of a dial plate with respect to the dial plate having a penetration hole and extending along the dial plate, a shaft protruding toward the penetration hole, and a light guide connecting the pointer main body and the shaft; a lightproof first shielding member that covers a proximal end portion of the pointer main body and the light guide from a front side and a lateral side; and a lightproof second shielding member that covers the proximal end portion of the pointer main body and the light guide from a back side and engages with the first shielding member, wherein the pointer main body emits light by light emitted from a light source disposed on a back side of the dial plate and incident on the shaft, and the second shielding member has a protrusion that protrudes toward the front side along an axial direction of the shaft, and closes a gap between the first shielding member and a side face of the pointer main body.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a vehicle display device pointer according to an embodiment of the present invention will be described in detail with reference to the drawings. The present invention is not limited by the embodiment. In addition, constituent elements in the following embodiment include those that can be easily conceived by those skilled in the art or those that are substantially the same.

Embodiment

Figure 1:
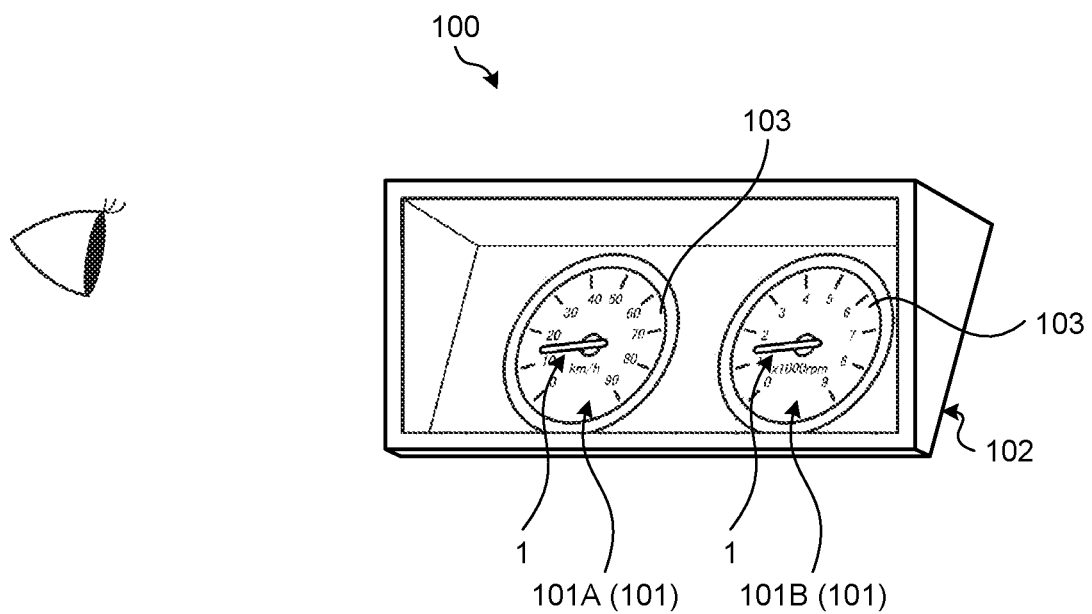
FIG. 1 is a diagram illustrating a schematic configuration of a vehicle display device according to an embodiment.
Figure 4:
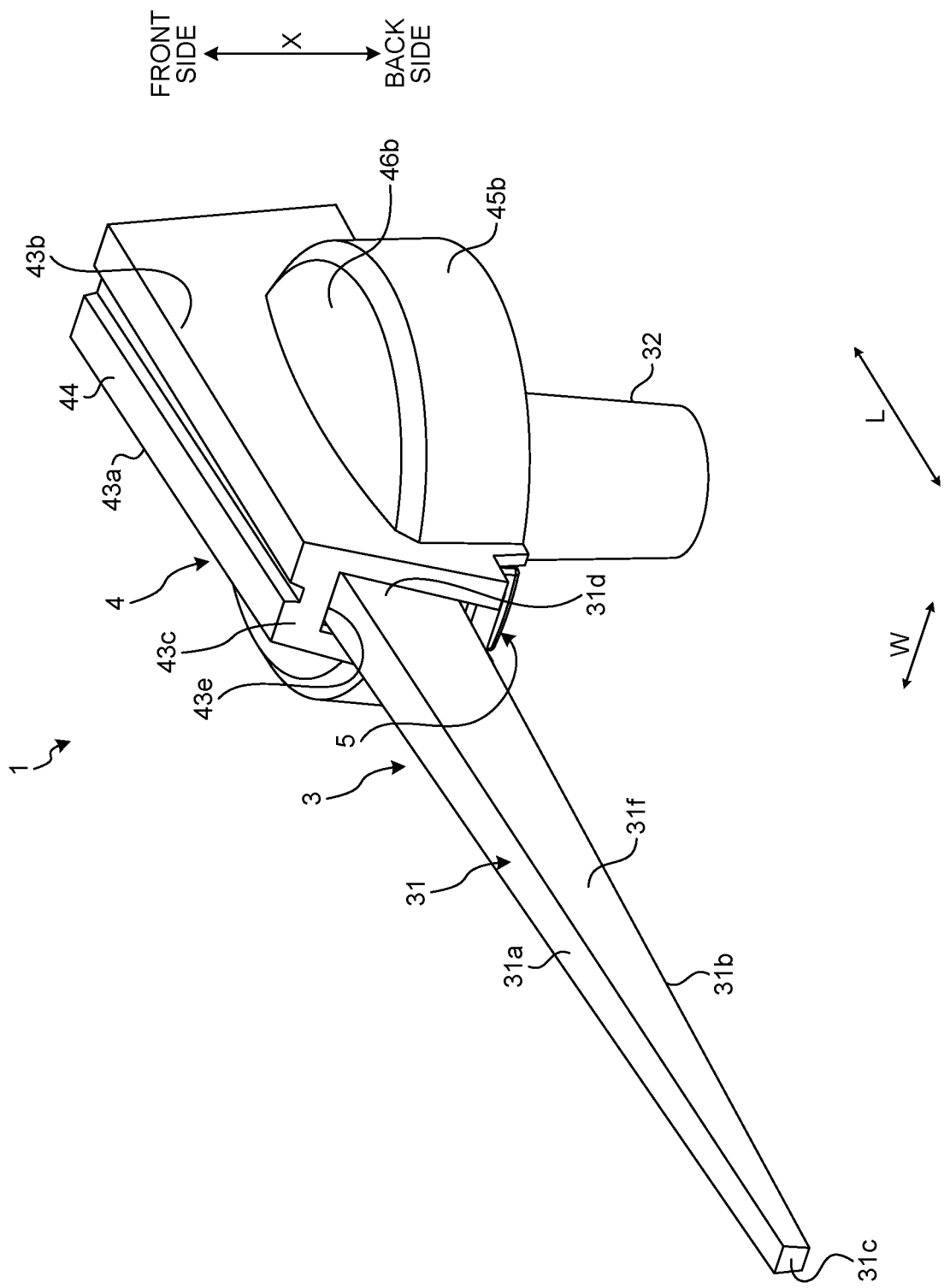
FIG. 4 is a perspective view of the vehicle display device pointer according to the embodiment.
Figure 5:
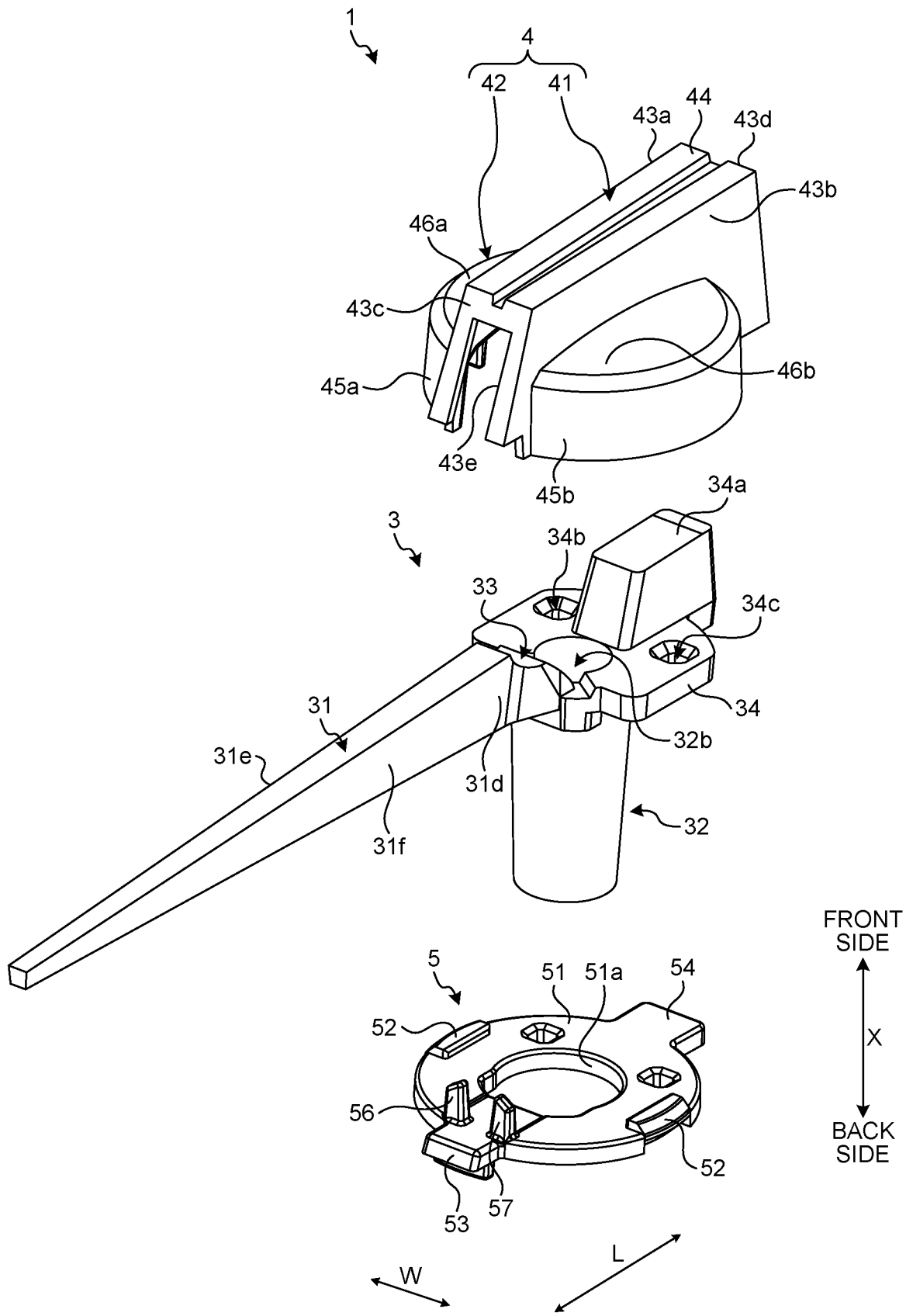
FIG. 5 is an exploded perspective view of the vehicle display device pointer according to the embodiment.
Figure 6:
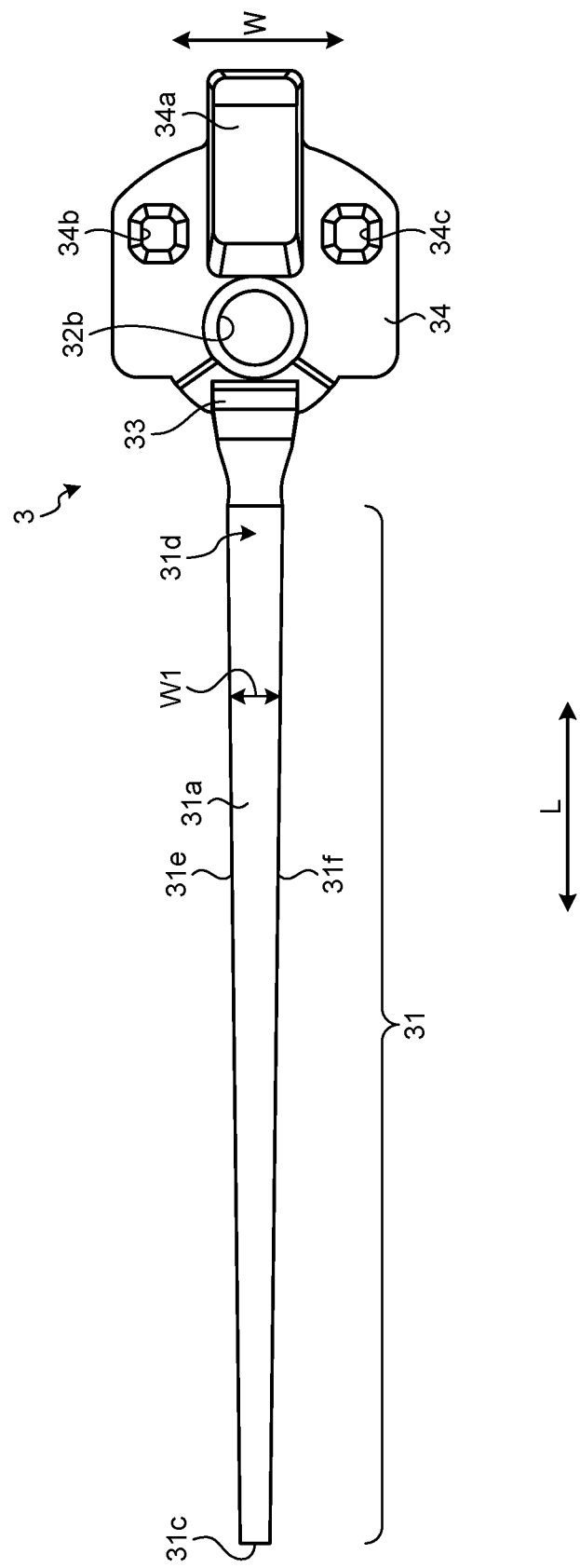
FIG. 6 is a plan view of the pointer according to the embodiment.
Figure 7:
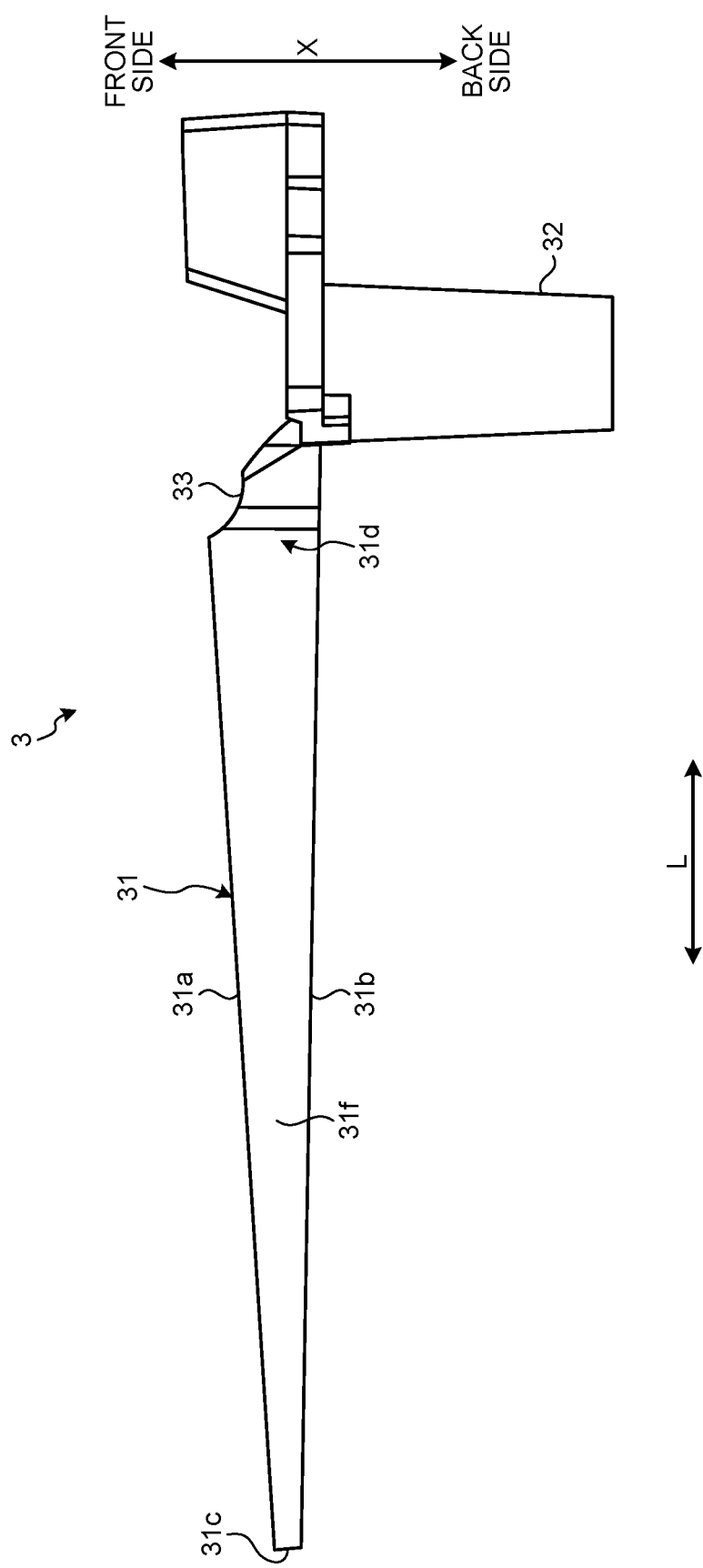
FIG. 7 is a side view of the pointer according to the embodiment.
Figure 8:
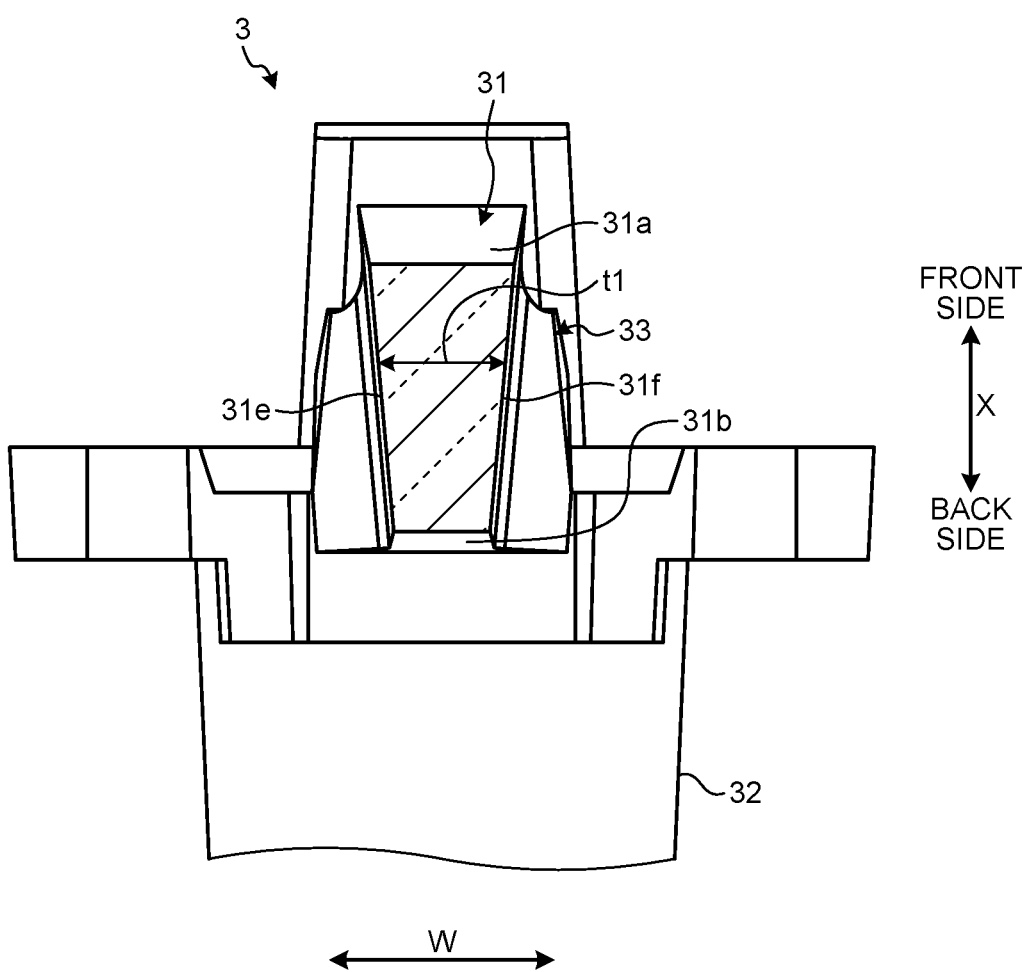
FIG. 8 is a cross-sectional view of a pointer main body according to the embodiment.
Figure 9:
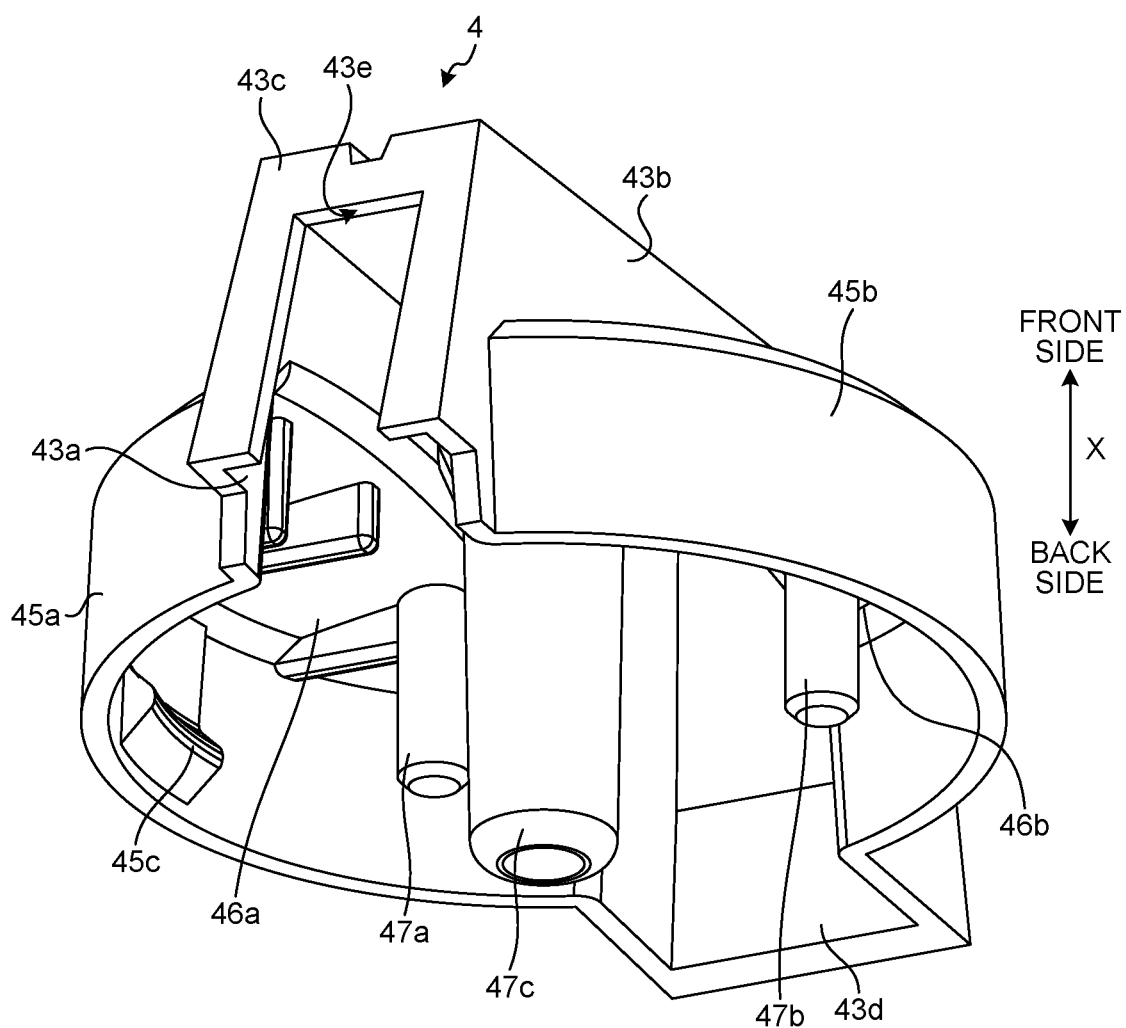
FIG. 9 is a perspective view of a first shielding member according to the embodiment.
Figure 10:
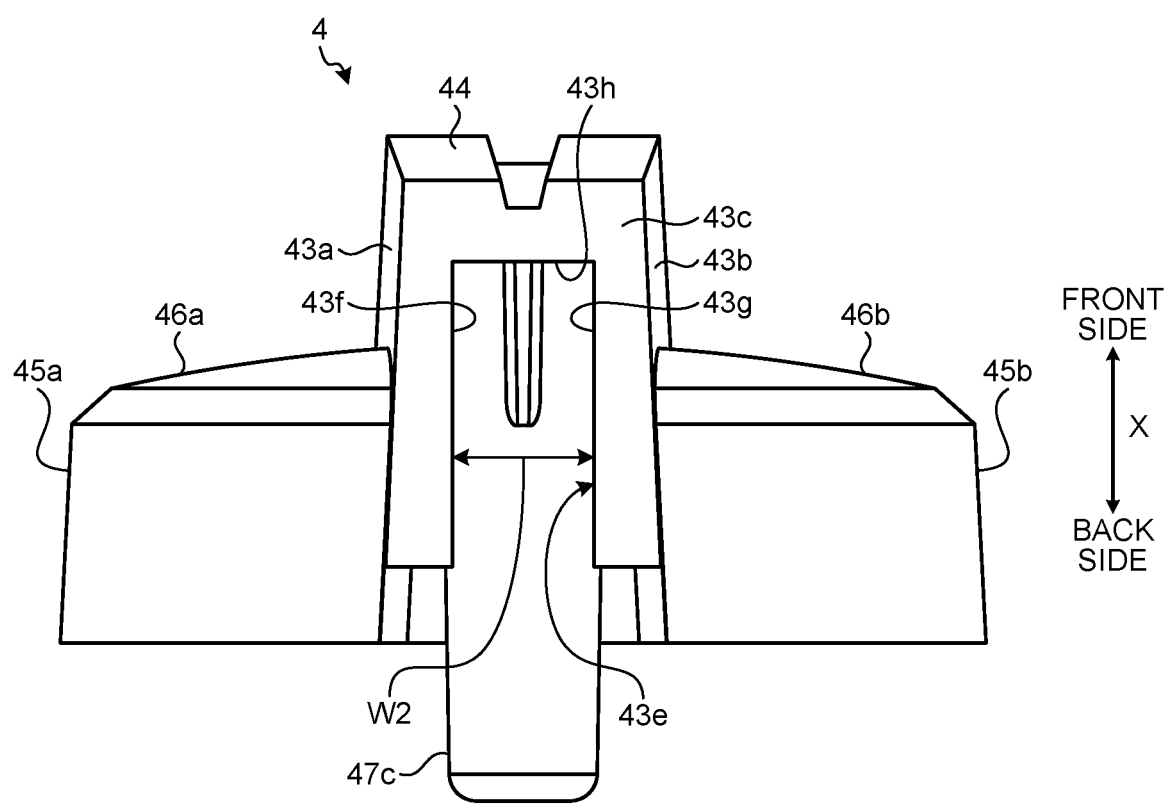
FIG. 10 is a front view of the first shielding member according to the embodiment.
Figure 11:
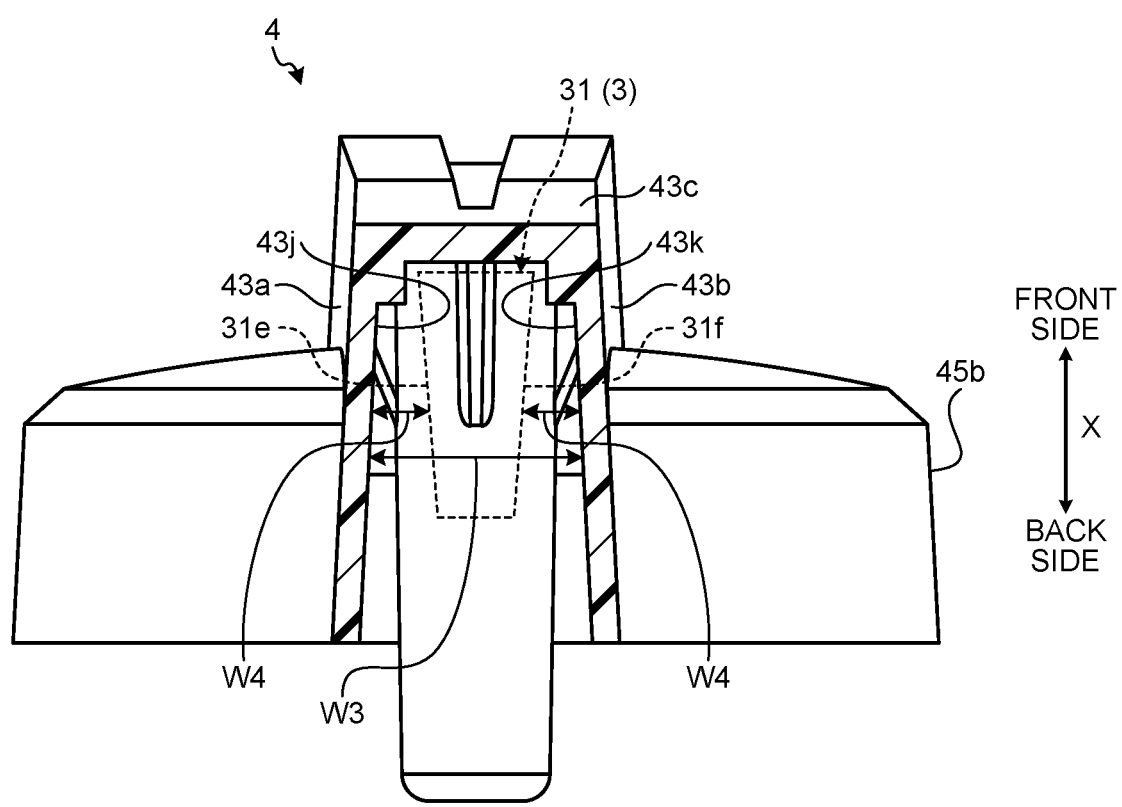
FIG. 11 is a cross-sectional view of the first shielding member according to the embodiment.
Figure 12:
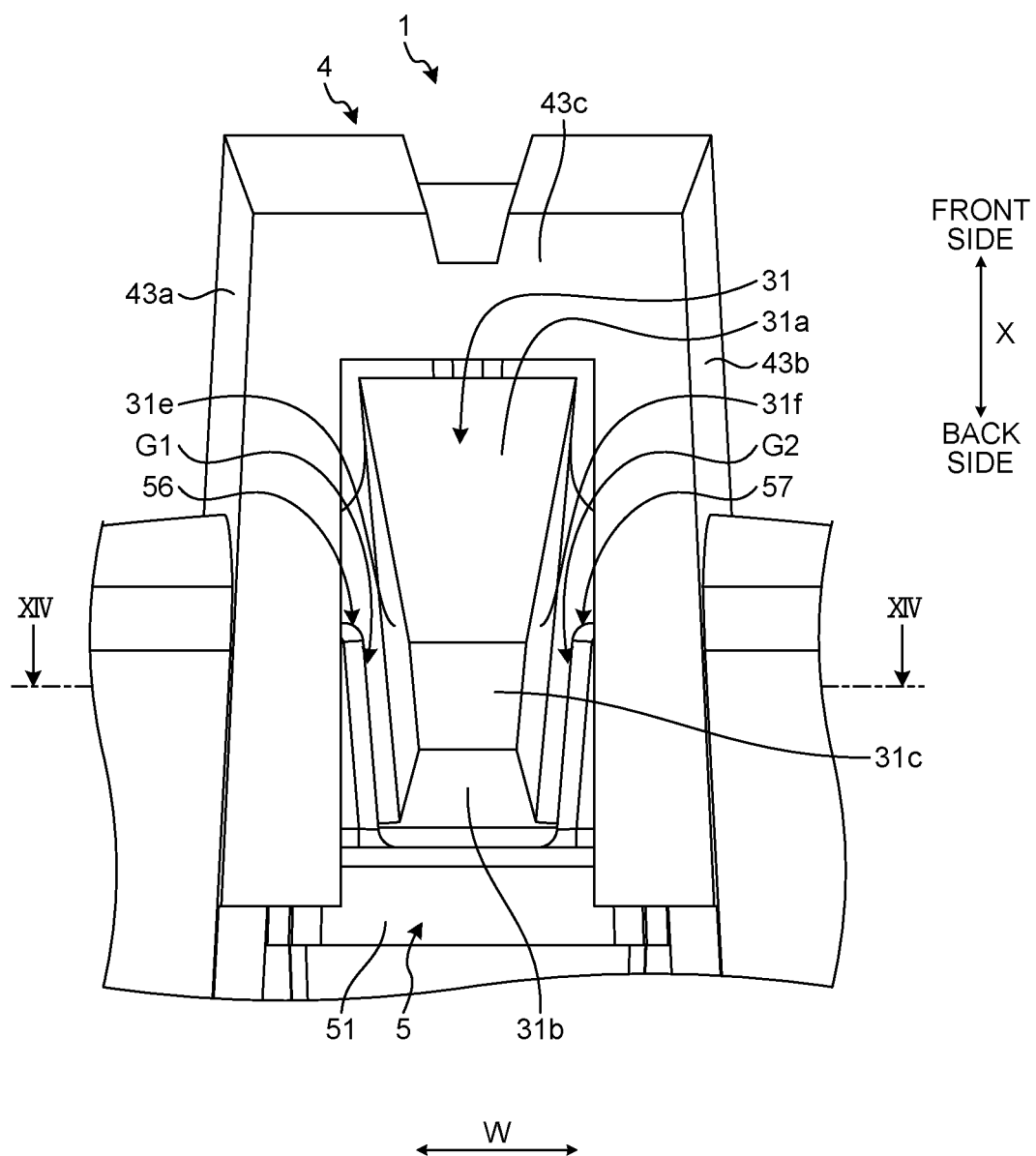
FIG. 12 is an enlarged front view of the vehicle display device pointer according to the embodiment.
Figure 13:
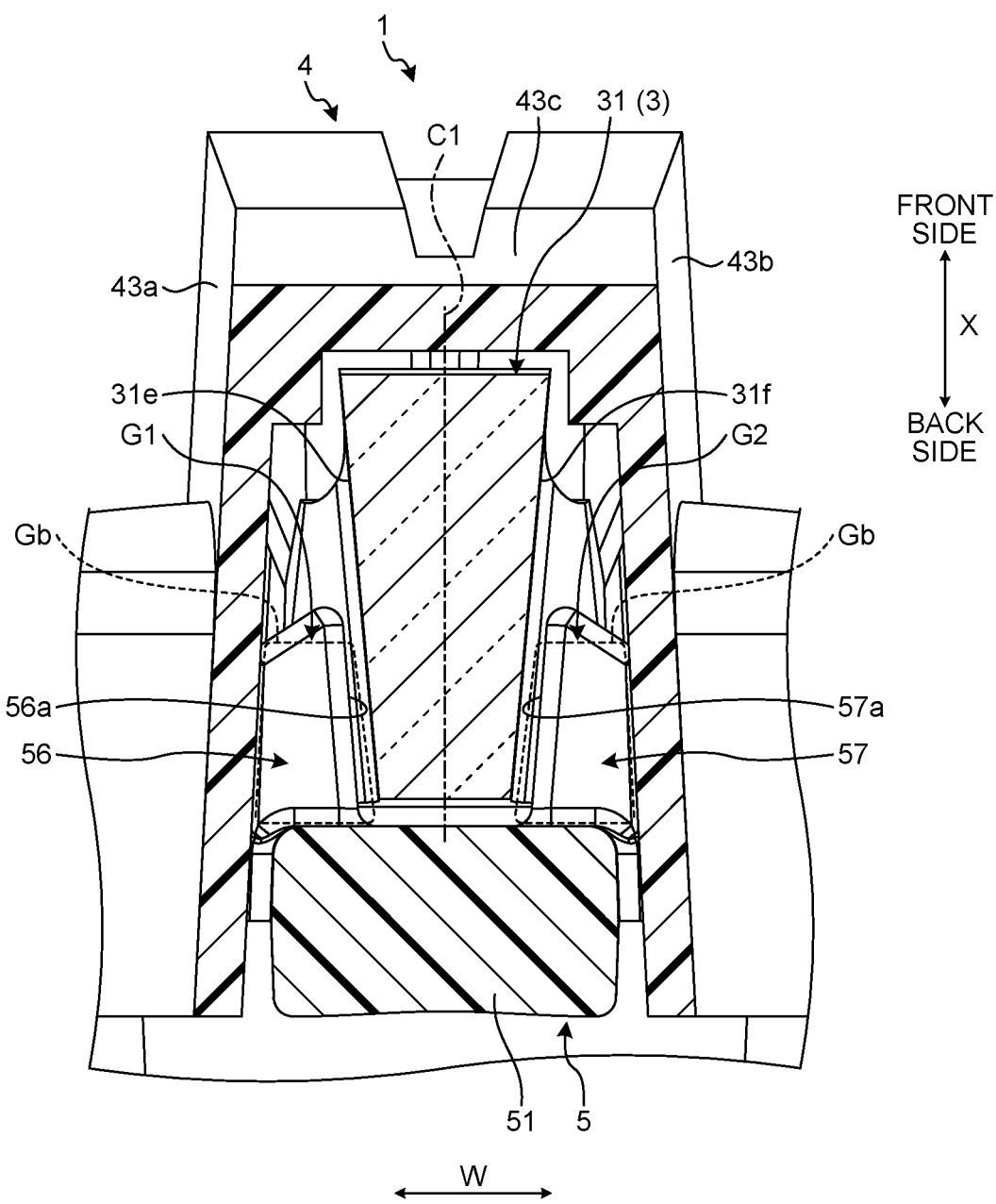
FIG. 13 is a cross-sectional view of the vehicle display device pointer according to the embodiment.
Figure 14:
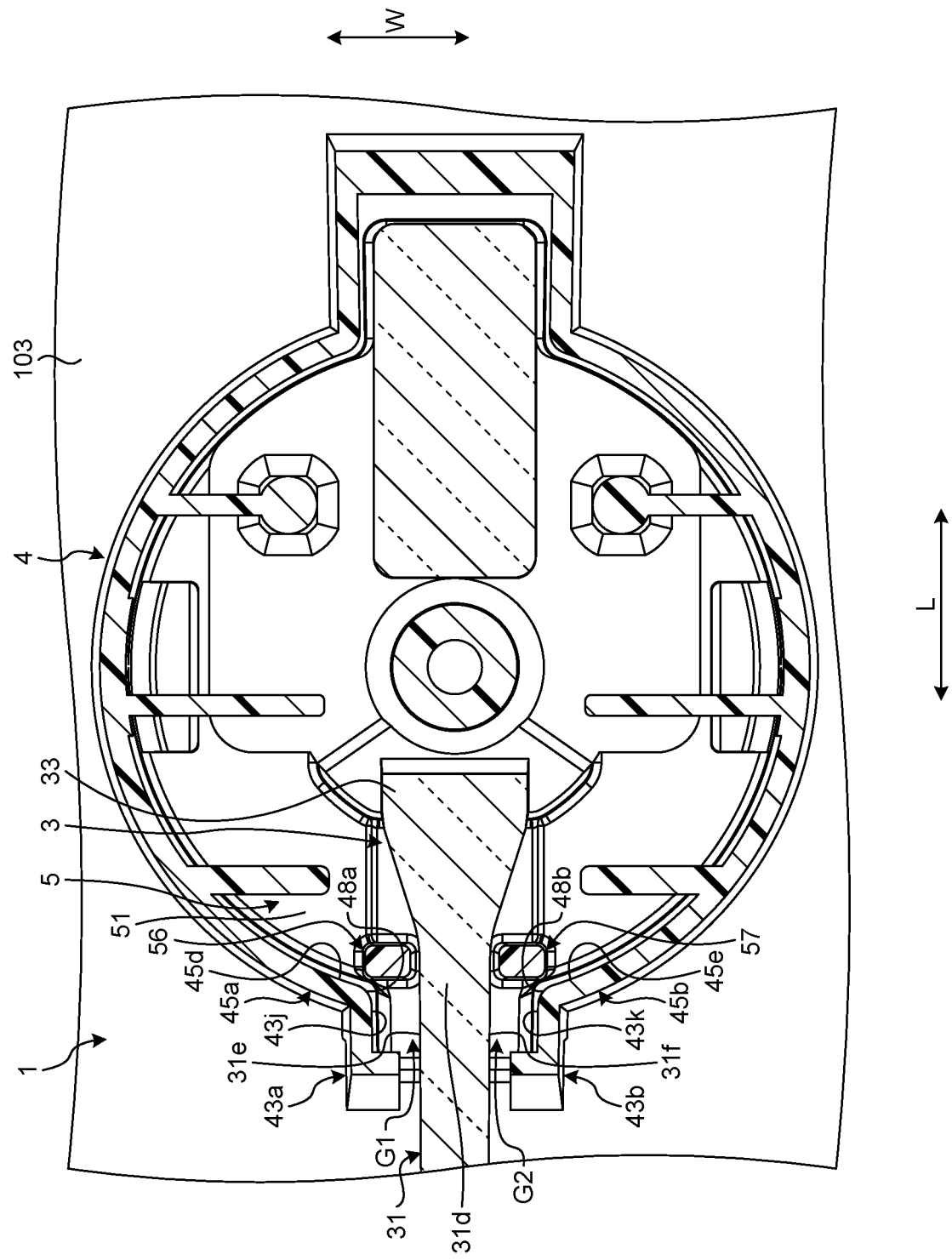
FIG. 14 is another cross-sectional view of the vehicle display device pointer according to the embodiment.
Figure 15:
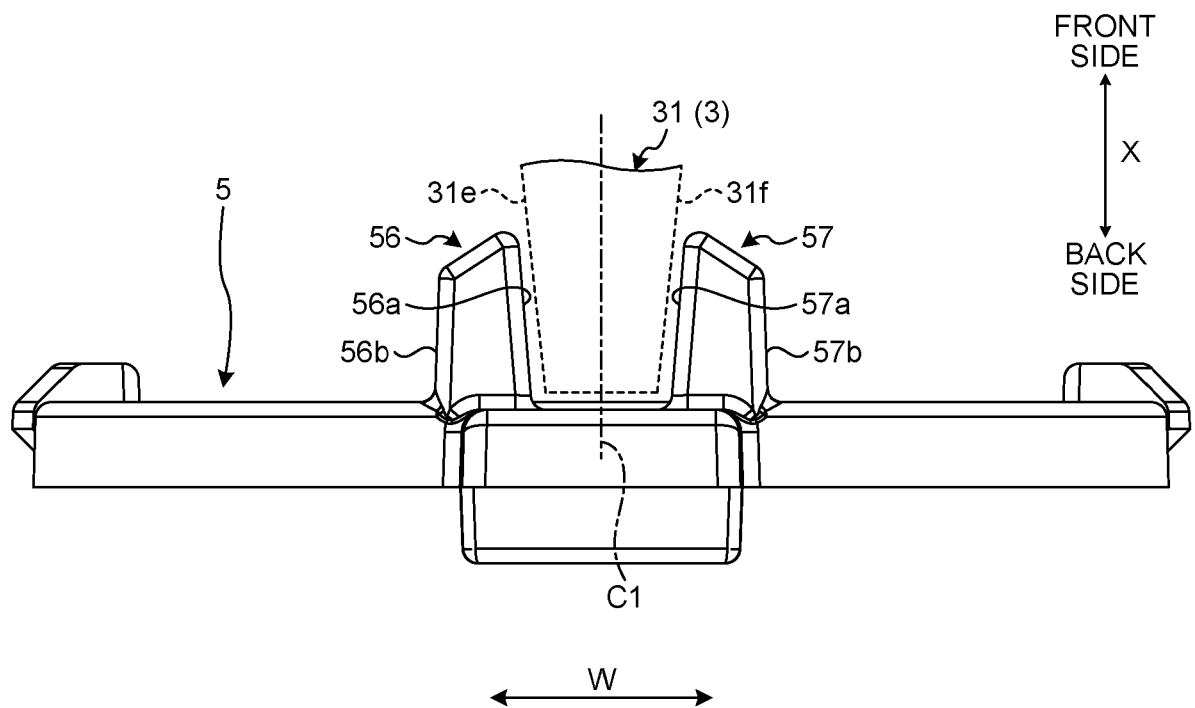
FIG. 15 is a front view of a second shielding member according to the embodiment.

Embodiments will be described with reference to FIGS. 1 to 15. The present embodiment relates to a vehicle display device pointer. FIG. 1 is a diagram illustrating a schematic configuration of a vehicle display device according to an embodiment, FIG. 2 is a plan view of a vehicle display device pointer according to the embodiment, FIG. 3 is a cross-sectional view of the vehicle display device pointer according to the embodiment, FIG. 4 is a perspective view of the vehicle display device pointer according to the embodiment, FIG. 5 is an exploded perspective view of the vehicle display device pointer according to the embodiment, FIG. 6 is a plan view of the pointer according to the embodiment, FIG. 7 is a side view of the pointer according to the embodiment, FIG. 8 is a cross-sectional view of a pointer main body according to the embodiment, FIG. 9 is a perspective view of a first shielding member according to the embodiment, FIG. 10 is a front view of the first shielding member according to the embodiment, FIG. 11 is a cross-sectional view of the first shielding member according to the embodiment, FIG. 12 is an enlarged front view of the vehicle display device pointer according to the embodiment, FIG. 13 is a cross-sectional view of the vehicle display device pointer according to the embodiment, FIG. 14 is another cross-sectional view of the vehicle display device pointer according to the embodiment, and FIG. 15 is a front view of a second shielding member according to the embodiment.

Figure 2:
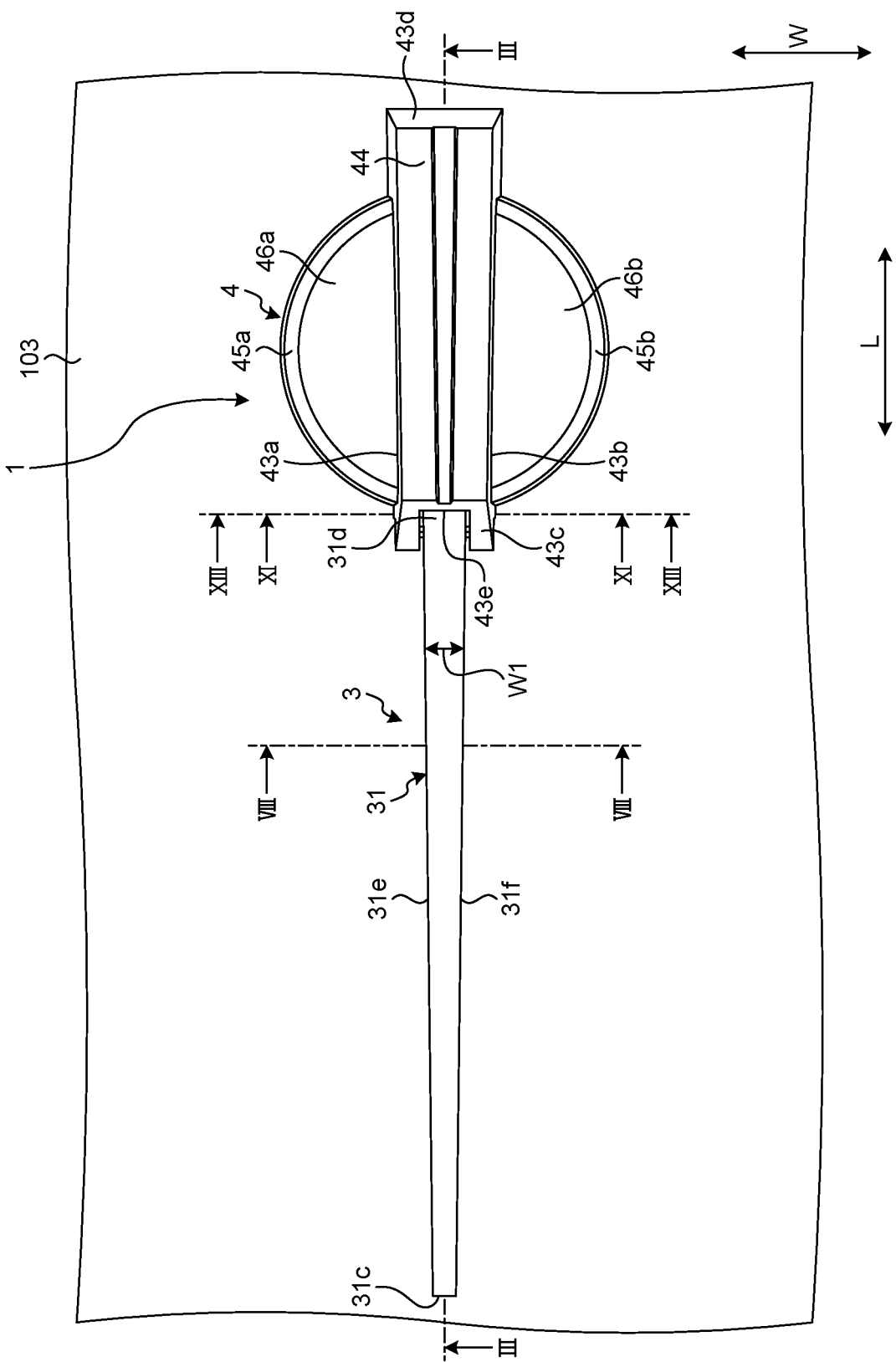
FIG. 2 is a plan view of a vehicle display device pointer according to the embodiment.
Figure 3:
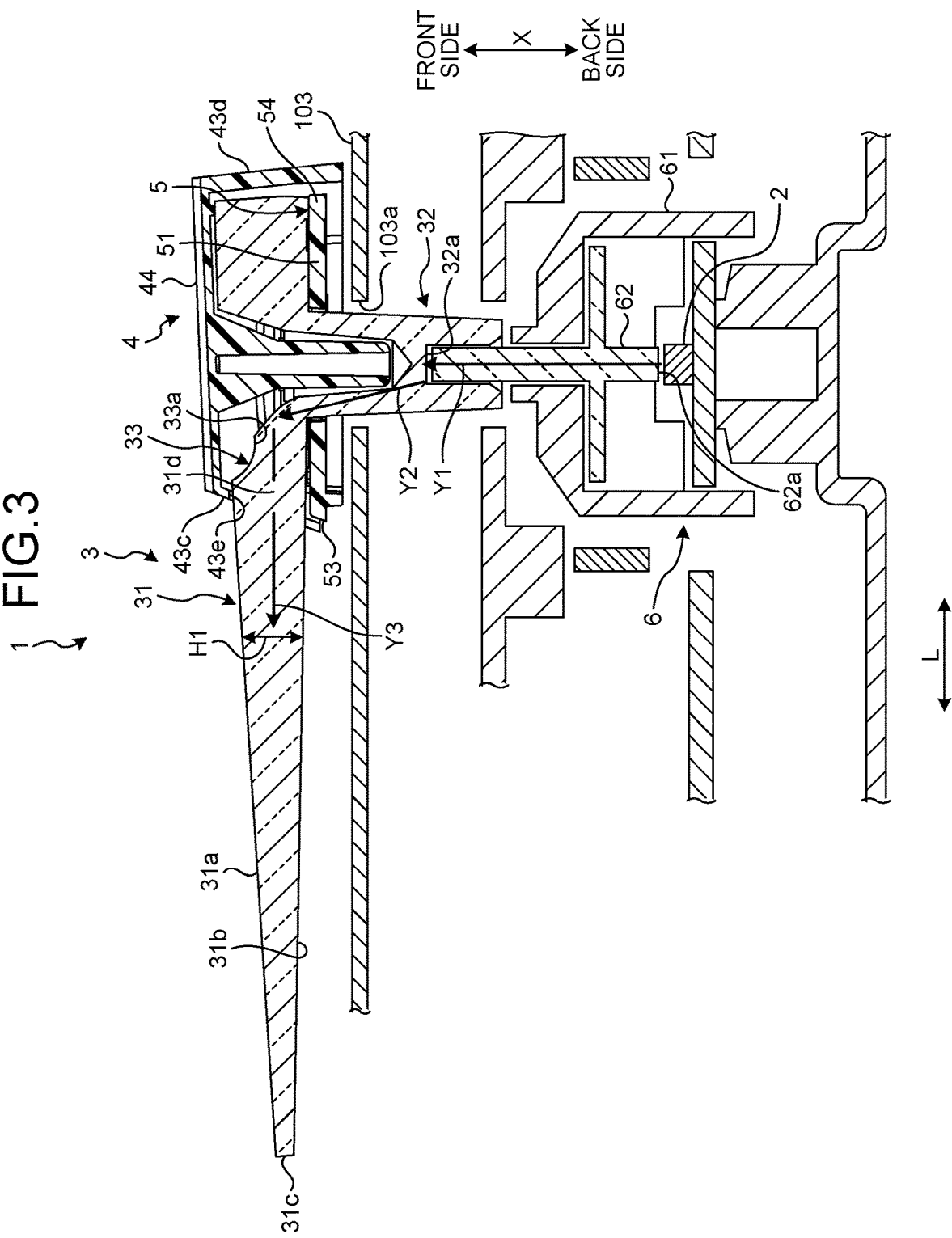
FIG. 3 is a cross-sectional view of the vehicle display device pointer according to the embodiment.

A III-III cross section of FIG. 2 is illustrated in FIG. 3. A VIII-VIII cross section of FIG. 2 is illustrated in FIG. 8. A XIII-XIII cross section of FIG. 2 is illustrated in FIG. 13. FIG. 11 illustrates a cross-section of the first light-shielding member at the same cross-sectional position as FIG. 13. A XIV-XIV cross section of FIG. 12 is illustrated in FIG. 14.

A vehicle display device pointer 1 according to the present embodiment is used in a vehicle display device 100 as illustrated in FIG. 1 or the like. The vehicle display device 100 is a display device mounted on a vehicle such as an automobile. The vehicle display device 100 is, for example, an in-vehicle meter. The vehicle display device 100 is disposed, for example, on an instrument panel of the vehicle.

The vehicle display device 100 has a display unit 101, a housing 102, and a dial plate 103. The housing 102 is fixed to an instrument panel or the like. The display unit 101 of the present embodiment includes a first display unit 101A and a second display unit 101B. The first display unit 101A and the second display unit 101B are arranged side by side along a width direction of the vehicle display device 100. The first display unit 101A and the second display unit 101B each have a dial plate 103 and a vehicle display device pointer 1. The shapes of the first display unit 101A and the second display unit 101B are, for example, circular. The first display unit 101A and the second display unit 101B of the present embodiment display information on the traveling states of the vehicle by the vehicle display device pointer 1. The first display unit 101A displays, for example, the traveling speed of the vehicle by the vehicle display device pointer 1. The second display unit 101B displays, for example, the rotational speed of the engine mounted on the vehicle by the vehicle display device pointer 1.

As illustrated in FIGS. 2 to 5, the vehicle display device pointer 1 of the present embodiment has a pointer 3, a first shielding member 4 and a second shielding member 5.

In the following description, a side of the pointer 3 directed toward one side along the axial direction X is referred to as a "front side", and a side directed toward the other side is referred to as a "back side". The front side is a side of a passenger who visually recognizes the vehicle display device pointer 1, and is typically a rear side in a front-rear direction of the vehicle. The back side is a side opposite to the front side, and is typically a front side in the front-rear direction of the vehicle. Further, the axial direction X is a direction of a central axis of a shaft 32 to be described later.

As illustrated in FIG. 3, the dial plate 103 has a penetration hole 103*a*. The dial plate 103 of the present embodiment is configured to have a lightproof property. The dial plate 103 has, for example, a light-shielding layer of dark ink on the front side. In the dial plate 103 of the present embodiment, at least a region around the penetration hole 103*a* is configured to have a lightproof property. The dial plate 103 may be configured such that the entire region has the lightproof property. In the dial plate 103, the portions of the scales or characters indicated by the pointer 3 may have translucency.

A light source 2 is disposed on the back side of the dial plate 103. The light source 2 is, for example, a light emitting element such as a light emitting diode (LED). The light source 2 of the present embodiment is disposed inside a motor 6 that drives the pointer 3. The motor 6 is disposed coaxially with the penetration hole 103*a* on the back side of the dial plate 103. The motor 6 has a housing 61, a rotary shaft 62, and a drive mechanism. The motor 6 of the present embodiment is a stepping motor. The motor 6 can position the rotary shaft 62 at an arbitrary rotational position by a drive mechanism. The rotary shaft 62 is coaxially disposed with the penetration hole 103*a*. The rotary shaft 62 penetrates the housing 61 along the axial direction X, and a distal end portion of the rotary shaft 62 protrudes from the housing 61 toward the penetration hole 103*a*. The rotary shaft 62 is formed of resin or the like having translucency.

The light source 2 is disposed inside the housing 61. The light source 2 is disposed on the back side with respect to the rotary shaft 62. The light source 2 is disposed to face an end face 62*a* on the proximal end side of the rotary shaft 62. The light source 2 emits light toward the end face 62*a* of the rotary shaft 62.

The pointer 3 is a member having a colorless or colored translucency. The pointer 3 may be a transparent member or a semi-transparent member. The pointer 3 is formed of, for example, a translucent synthetic resin or the like. The pointer 3 has a pointer main body 31, a shaft 32, and a light guide 33. The pointer main body 31, the shaft 32, and the light guide 33 are integrally formed. The pointer main body 31 is disposed on the front side of the dial plate 103. The pointer main body 31 is a plate-shaped component extending along the board face of the dial plate 103. In the present specification, a direction in which the pointer main body 31 extends is referred to as an "extension direction L". Further, when viewed along the axial direction X, a direction orthogonal to the extension direction L is referred to as a "width direction W". The width direction W is a direction orthogonal to the axial direction X and the extension direction L.

In the pointer main body 31 of the present embodiment, a front face 31*a* is inclined to approach the dial plate 103 toward a distal end 31*c* of the pointer main body 31 along the extension direction L. A back face 31*b* of the pointer main body 31 is substantially parallel to the dial plate 103. The back face 31*b* may be inclined so as to be away from the dial plate 103 toward the distal end 31*c* along the extension direction L. A height H1 of the pointer main body 31 becomes smaller from a proximal end portion 31*d* to the distal end 31*c* of the pointer main body 31. As illustrated in FIGS. 2 and 6, a width W1 of the front face 31*a* of the pointer main body 31 decreases from the proximal end portion 31*d* to the distal end 31*c* of the pointer main body 31.

The shaft 32 protrudes toward the penetration hole 103*a*. The shaft 32 is a columnar component having a circular cross-sectional shape. As illustrated in FIG. 3, a hole 32*a* is formed at the distal end portion of the shaft 32. A rotary shaft 62 of the motor 6 is fitted into the hole 32*a*. Therefore, the pointer 3 rotates integrally with the rotary shaft 62. In the pointer 3 of the present embodiment, the distal end of the shaft 32 protrudes to the back side with respect to the dial plate 103. That is, the shaft 32 is supported by the rotary shaft 62 in a state of being inserted into the penetration hole 103*a*. The shaft 32 of the present embodiment is formed in a tapered shape in which an outer diameter decreases from the proximal end toward the distal end in the axial direction X.

The light guide 33 connects the shaft 32 and the pointer main body 31. The light guide 33 guides light from the shaft 32 to the pointer main body 31. The light emitted by the light source 2 passes through the rotary shaft 62 of the motor 6 and is incident on the shaft 32, as illustrated by an arrow Y1 in FIG. 3. The light incident on the shaft 32 passes through the inside of the shaft 32 and proceeds toward a reflection face 33a of the light guide 33 as indicated by an arrow Y2. The reflection face 33a reflects the incident light toward the pointer main body 31. The light reflected by the reflection face 33a proceeds inside the pointer main body 31 in the extension direction L as illustrated by an arrow Y3. The pointer main body 31 emits light by the light guided to the pointer main body 31 by the light guide 33. That is, the pointer 3 is a light emission pointer in which the pointer main body 31 emits light by the light incident on the shaft 32.

As illustrated in FIG. 5 and the like, the light guide 33 has a flange 34. The flange 34 protrudes from the shaft 32 in a direction orthogonal to the axial direction X. The shape of the flange 34 is a substantially rectangular flat plate shape. The flange 34 is formed with a protrusion 34a. The protrusion 34a is disposed on the side of the shaft 32 opposite to the pointer main body 31. The protrusion 34a protrudes toward the front side. Holes 34b and 34c are formed in the flange 34. The holes 34b and 34c penetrate through the flange 34 along the axial direction X. Further, a hole 32b is formed in the shaft 32. The hole 32b opens toward the front side.

The first shielding member 4 is a lightproof cap member which covers a part of the pointer 3. The first shielding member 4 covers the proximal end portion 31d of the pointer main body 31 and the light guide 33. The first shielding member 4 is formed of a synthetic resin or the like. As can be seen from FIGS. 2 to 5, the first shielding member 4 covers the proximal end portion 31d of the pointer main body 31 and the light guide 33 from the front side and the lateral side. The first shielding member 4 of the present embodiment integrally covers the proximal end portion 31d and the light guide 33.

As illustrated in FIG. 5 and the like, the first shielding member 4 has a first cover 41 and a second cover 42. The first cover 41 and the second cover 42 are integrally formed. The first cover 41 is a part that mainly covers the protrusion 34a and the proximal end portion 31d of the pointer main body 31. The first cover 41 has side walls 43a, 43b, 43c and 43d and a top wall 44. The first side wall 43a and the second side wall 43b face each other in the width direction W with the proximal end portion 31d and the protrusion 34a interposed therebetween.

The top wall 44 faces the proximal end portion 31d and the light guide 33 in the axial direction X. The top wall 44 connects the first side wall 43a and the second side wall 43b, and closes a space between the side walls 43a and 43b from the front side. The top wall 44 connects the front side end portion of the first side wall 43a and the front side end portion of the second side wall 43b. That is, the cross-sectional shape of the space surrounded by the side walls 43a and 43b and the top wall 44 is substantially rectangular.

The third side wall 43c and the fourth side wall 43d face each other in the extension direction L. The side walls 43c and 43d connect the first side wall 43a and the second side wall 43b, respectively. The third side wall 43c connects the end portions of the side walls 43a and 43b on the side of the pointer main body 31. The fourth side wall 43d connects the end portions of the side walls 43a and 43b on the side of the protrusion 34a.

The third side wall 43c has an opening 43e. The opening 43e is a notch formed on the third side wall 43c. The shape of the opening 43e is a shape corresponding to the cross-sectional shape of the pointer main body 31. The pointer main body 31 protrudes from the inside of the first shielding member 4 to the outside via the opening 43e. The third side wall 43c of the present embodiment is inclined with respect to the axial direction X. An inclination direction of the third side wall 43c is a direction approaching the distal end 31c of the pointer main body 31 toward the back side along the axial direction X. That is, the third side wall 43c is slightly inclined so that the outer side face faces the front side.

The second cover 42 has a first peripheral wall 45a, a second peripheral wall 45b, a first top wall 46a, and a second top wall 46b. The first peripheral wall 45a and the first top wall 46a are connected to the first side wall 43a. The second peripheral wall 45b and the second top wall 46b are connected to the second side wall 43b. The first peripheral wall 45a and the second peripheral wall 45b are semi-cylindrical components. The first peripheral wall 45a protrudes in the width direction W from the first side wall 43a. The second peripheral wall 45b protrudes in the width direction W from the second side wall 43b. The first top wall 46a protrudes in the width direction W from the first side wall 43a, and closes the space surrounded by the first peripheral wall 45a from the front side. The second top wall 46b protrudes in the width direction W from the second side wall 43b, and closes the space surrounded by the second peripheral wall 45b from the front side.

As illustrated in FIG. 9, the first shielding member 4 has shafts 47a, 47b and 47c. The shaft 47a protrudes from the first top wall 46a toward the back side. The shaft 47b protrudes from the second top wall 46b toward the back side. The shaft 47c protrudes from the top wall 44 toward the back side. The shaft 47c is inserted into the hole 32b of the pointer 3. The shafts 47a and 47b are inserted into the holes 34b and 34c of the pointer 3, respectively. An engagement protrusion 45c is disposed on the inner side face of the first peripheral wall 45a. The same engagement protrusion 45c is also disposed on the inner side face of the second peripheral wall 45b. The engagement protrusion 45c locks the second shielding member 5.

As illustrated in FIG. 10, the opening 43e has a first edge 43f, a second edge 43g, and a third edge 43h. The first edge 43f, the second edge 43g, and the third edge 43h all have a linear shape. The first edge 43f and the second edge 43g extend along the axial direction X and face each other in the width direction W. The third edge 43h is a boundary of the front side of the opening 43e and extends in the width direction W. In the opening 43e of the present embodiment, the first edge 43f and the second edge 43g are substantially parallel to each other. However, the opening 43e may be formed in a tapered shape in which a gap W2 between the first edge 43f and the second edge 43g widens toward the back side in the axial direction X.

As illustrated in FIG. 11, the first side wall 43a and the second side wall 43b face a first side face 31e and a second side face 31f of the pointer main body 31. The inner side face of the first side wall 43a is a facing wall face 43j that faces the first side face 31e. The inner side face of the second side wall 43b is a facing wall face 43k that faces the second side face 31f. That is, the first shielding member 4 has a pair of facing wall faces 43j and 43k which are wall faces facing the side faces 31e and 31f of the pointer main body 31. The facing wall faces 43j and 43k are each inclined with respect to the axial direction X. More specifically, the facing wall faces 43j and 43k are inclined with respect to the axial direction X such that a gap W3 between the pair of facing wall faces 43*j* and 43*k* widens toward the back side in the axial direction X.

The inclination of the facing wall faces 43*j* and 43*k* is provided, for example, as a draft from a mold when forming the first shielding member 4. The inclination of the facing wall faces 43*j* and 43*k* may be provided by the design requirements of the first shielding member 4 or the design requirements. Since the facing wall faces 43*j* and 43*k* are inclined, a gap W4 between the side faces 31*e* and 31*f* and the facing wall faces 43*j* and 43*k* widen at the position on the back side. More specifically, the gap W4 widens from the front side to the back side.

Further, as illustrated in FIG. 8, the cross-sectional shape of the pointer main body 31 of the present embodiment is a tapered shape in which the plate thickness t1 becomes thinner toward the back side along the axial direction X. The first side face 31*e* and the second side face 31*f* are inclined surfaces which are inclined with respect to the axial direction X, respectively. The first side face 31*e* is inclined with respect to the axial direction X to approach the second side face 31*f* toward the back side along the axial direction X. The second side face 31*f* is inclined with respect to the axial direction X to approach the first side face 31*e* toward the back side along the axial direction X.

The tapered shape of the pointer main body 31 is provided, for example, as a draft from the mold when forming the pointer 3. The inclination of the side faces 31*e* and 31*f* may be provided by the design requirements or the like. Due to the tapered shape of the pointer main body 31, a gap W4 (FIG. 11) between the side faces 31*e* and 31*f* and the facing wall faces 43*j* and 43*k* widens at the position of the back side.

The second shielding member 5 is a lightproof member which covers the proximal end portion 31*d* of the pointer main body 31 and the light guide 33 from the back side. The second shielding member 5 is formed of, for example, a synthetic resin or the like. The second shielding member 5 of this embodiment has protrusions 56 and 57, as illustrated in FIG. 5 or the like. As it will be described below, the protrusions 56 and 57 close the gap between the first shielding member 4 and the side faces 31*e* and 31*f* of the pointer main body 31. Therefore, the vehicle display device pointer 1 of this embodiment can suppress the light leakage toward the dial plate 103.

As illustrated in FIG. 5 or the like, the second shielding member 5 has a main body 51, an engagement 52, a first piece 53, a second piece 54, a first protrusion 56, and a second protrusion 57. The main body 51, the engagement 52, the first piece 53, the second piece 54, the first protrusion 56, and the second protrusion 57 are integrally formed. The main body 51 is a ring-shaped component. The main body 51 has a penetration hole 51*a* through which the shaft 32 of the pointer 3 is inserted. The engagements 52 are disposed one by one at both end portions of the main body 51 in the width direction W. The engagement 52 engages with the engagement protrusion 45*c* of the first shielding member 4.

The first piece 53 and the second piece 54 protrude from the main body 51 along the extension direction L. The first piece 53 and the second piece 54 are rectangular plate-like components. The first piece 53 protrudes toward the pointer main body 31 along the extension direction L. The first piece 53 covers the back of the light guide 33 and the back of the pointer main body 31. The second piece 54 protrudes toward the protrusion 34*a* along the extension direction L. The second piece 54 covers the back of the light guide 33.

The first protrusion 56 and the second protrusion 57 protrude from the main body 51 toward the front side along the axial direction X. The two protrusions 56 and 57 are disposed at the end portion of the main body 51 on the pointer main body 31 side. More specifically, the two first protrusions 56 and 57 are disposed to be adjacent to the proximal end portion of the first piece 53. The two protrusions 56 and 57 face each other in the second direction W.

As illustrated in FIGS. 12 to 14, the first protrusion 56 closes the gap G1 between the first side face 31*e* of the pointer main body 31 and the first shielding member 4. The second protrusion 57 closes the gap G2 between the second side face 31*f* of the pointer main body 31 and the first shielding member 4.

As illustrated in FIGS. 13 and 14, the gap G1 exists between the first side face 31*e* and the facing wall face 43*j* of the first shielding member 4. The first protrusion 56 closes the gap G1, and suppresses the light leakage from the inside of the first shielding member 4 to the outside. Further, the second protrusion 57 closes the gap G2 between the second side face 31*f* and the facing wall face 43*k*, and suppresses the light leakage from the inside of the first shielding member 4 to the outside. In particular, it is desirable to be able to suppress the light leakage toward the dial plate 103, that is, the light leakage toward the back side, among the light leakage from the first shielding member 4 to the outside. The first protrusion 56 and the second protrusion 57 of the present embodiment can suitably suppress the light leakage to the dial plate 103 as described below.

The first protrusion 56 and the second protrusion 57 protrude from the main body 51 of the second shielding member 5 toward the front side. Therefore, a region Gb (see FIG. 13) on the back side among the gaps G1 and G2 can be closed intensively. Therefore, the protrusions 56 and 57 of the present embodiment can shield the light that tries to proceed from the inside of the first shielding member 4 toward the dial plate 103, and can sufficiently suppress the light leakage to the dial plate 103.

Further, the protrusions 56 and 57 of the present embodiment are configured such that a gap with the pointer main body 31 is not easily generated. As illustrated in FIG. 13, the protrusions 56 and 57 have facing faces 56*a* and 57*a* that face the side faces 31*e* and 31*f* of the pointer main body 31. The facing faces 56*a* and 57*a* of the present embodiment are planes. The facing faces 56*a* and 57*a* are each inclined with respect to the axial direction X.

The facing face 56*a* of the first protrusion 56 is inclined with respect to the axial direction X toward the same side as the inclination direction of the first side face 31*e*. That is, the facing face 56*a* is inclined to approach the center line C1 of the pointer main body 31 toward the back side along the axial direction X. Further, the center line C1 is a center of the pointer main body 31 in the width direction W. Since the facing face 56*a* is inclined toward the same side as the first side face 31*e*, the gap between the facing face 56*a* and the first side face 31*e* is reduced. Therefore, the first protrusion 56 can sufficiently suppress the light leakage to the dial plate 103. The facing face 56*a* of the present embodiment is configured to be substantially parallel to the first side face 31*e*. Therefore, the gap between the facing face 56*a* and the first side face 31*e* is minimized.

Further, the first protrusion 56 is configured such that there is no gap between the first protrusion 56 and the facing wall face 43*j*, when viewed in the extension direction L. As illustrated in FIG. 14, the first protrusion 56 is disposed in the vicinity of a corner 48*a* in which the first side wall 43*a* and the first peripheral wall 45*a* intersect each other. More specifically, the first protrusion 56 is disposed to face the corner 48a in the extension direction L. The first protrusion 56 is disposed at a position closer to the light guide 33 with respect to the corner 48a and in proximity to the corner 48a. Therefore, as illustrated in FIG. 13, when viewed from the extension direction, the facing wall face 43j and the first protrusion 56 overlap each other. In other words, when viewed from the extension direction L, no gap is present between the facing wall face 43j and the first protrusion 56. Therefore, the first protrusion 56 can sufficiently suppress the light leakage from the inside of the first shielding member 4 to the dial plate 103.

Further, as illustrated in FIG. 15, an outer side face 56b of the first protrusion 56 is inclined with respect to the axial direction X. The outer side face 56b is a face of the first protrusion 56 opposite to the facing face 56a. In other words, the outer side face 56b is a face of the first protrusion 56 opposite to the side facing the first side face 31e of the pointer main body 31. The outer side face 56b is inclined with respect to the axial direction X toward the same side as the inclination direction of the facing wall face 43j. That is, the outer side face 56b is inclined so as to be away from the center line C1 of the pointer main body 31 in the width direction W toward the back side along the axial direction X. Since the outer side face 56b is inclined toward the same side as the facing wall face 43j, a gap is hard to be generated between the first protrusion 56 and the facing wall face 43j when viewed from the extension direction L. Moreover, since the outer side face 56b is inclined, interference between the first protrusion 56 and an inner side face 45d of the first peripheral wall 45a is suppressed. The inclination angle of the outer side face 56b may be determined, for example, such that the outer side face 56b is parallel to the facing wall face 43j.

The second protrusion 57 is configured in the same manner as the first protrusion 56. As illustrated in FIG. 13, the facing face 57a of the second protrusion 57 faces the second side face 31f in the width direction W. The facing face 57a is inclined with respect to the axial direction X toward the same side as the inclination direction of the second side face 31f. Thus, the gap between the facing face 57a and the second side face 31f is reduced. The facing face 57a is configured to be substantially parallel to the second side face 31f.

As illustrated in FIG. 14, the second protrusion 57 is disposed in the vicinity of a corner 48b in which the second side wall 43b and the second peripheral wall 45b intersect each other. The second protrusion 57 is disposed to face the corner 48b in the extension direction L. The second protrusion 57 is disposed at a position closer to the light guide 33 with respect to the corner 48b and in proximity to the corner 48b. Therefore, as illustrated in FIG. 13, when viewed from the extension direction L, the facing wall face 43k and the second protrusion 57 overlap each other. Therefore, the second protrusion 57 can sufficiently suppress the light leakage from the inside of the first shielding member 4 to the dial plate 103.

Further, as illustrated in FIG. 15, an outer side face 57b of the second protrusion 57 is inclined with respect to the axial direction X toward the same side as the inclination direction of the facing wall face 43k. Therefore, when viewed from the extension direction L, a gap is hard to be generated between the second protrusion 57 and the facing wall face 43k. Further, since the outer side face 57b is inclined, the interference between the second protrusion 57 and an inner side face 45e of the second peripheral wall 45b is suppressed. The inclination angle of the outer side face 57b may be determined, for example, such that the outer side face 57b is parallel to the facing wall face 43k.

As described above, the vehicle display device pointer 1 of the present embodiment includes the pointer 3, the first shielding member 4, and the second shielding member 5. The pointer 3 is a translucent member, and has a pointer main body 31, a shaft 32, and a light guide 33. The pointer main body 31 is disposed on the front side of the dial plate 103 with respect to the dial plate 103 having the penetration hole 103a, and extends along the dial plate 103. The shaft 32 protrudes toward the penetration hole 103a. The light guide 33 connects the pointer main body 31 and the shaft 32. The pointer main body 31 emits light by light emitted from the light source 2 disposed on the back side of the dial plate 103 and incident on the shaft 32.

The first shielding member 4 is a lightproof member which covers the proximal end portion 31d of the pointer main body 31 and the light guide 33 from the front side and the lateral side. The second shielding member 5 is a lightproof member which covers the proximal end portion 31d of the pointer main body 31 and the light guide 33 from the back side, and engages with the first shielding member 4. The second shielding member 5 has protrusions 56 and 57 which protrude toward the front side along the axial direction X of the shaft 32. The protrusions 56 and 57 close the gaps G1 and G2 between the first shielding member 4 and the side faces 31e and 31f of the pointer main body 31. The vehicle display device pointer 1 of the present embodiment closes the gaps G1 and G2 by the protrusions 56 and 57 protruding toward the front side. The protrusions 56 and 57 can sufficiently suppress the light leakage toward the dial plate 103. Further, the protrusions 56 and 57 function as a guide when assembling the second shielding member 5 to the first shielding member 4 and the pointer 3.

In the vehicle display device pointer 1 of the present embodiment, the cross-sectional shape of the pointer main body 31 in a cross section orthogonal to the extension direction L of the pointer main body 31 has a tapered shape in which a plate thickness t1 becomes thinner toward the back side along the axial direction X. When such a pointer main body 31 having the tapered shape is used, the gaps G1 and G2 between the side faces 31e and 31f of the pointer main body 31 and the first shielding member 4 easily widen on the back side. When such a pointer main body 31 having the tapered shape is used, since the second shielding member 5 has the protrusions 56 and 57, light leakage to the dial plate 103 is suitably suppressed.

In the vehicle display device pointer 1 of the present embodiment, the side faces 31e and 31f of the pointer main body 31 are inclined surfaces that are inclined with respect to the axial direction X. The protrusions 56 and 57 have facing faces 56a and 57a that face the side faces 31e and 31f of the pointer main body 31. The facing faces 56a and 57a are inclined with respect to the axial direction X toward the same side as the inclination directions of the side faces 31e and 31f of the pointer main body 31. Since the facing faces 56a and 57a are inclined toward the same side as the side faces 31e and 31f, the gap between the facing faces 56a and 57a and the side faces 31e and 31f is less likely to widen. Therefore, the protrusions 56 and 57 can preferably suppress light leakage toward the dial plate 103.

In the vehicle display device pointer 1 of the present embodiment, the first shielding member 4 has a pair of facing wall faces 43j and 43k, which are wall faces facing the side faces 31e and 31f of the pointer main body 31. The facing wall faces 43j and 43k are inclined with respect to the axial direction X such that a gap W3 between the pair of facing wall faces 43*j* and 43*k* widens toward the back side along the axial direction X. The protrusions 56 and 57 close the gaps G1 and G2 between the facing wall faces 43*j* and 43*k* and the side faces 31*e* and 31*f* of the pointer main body 31. When the facing wall faces 43*j* and 43*k* are inclined as described above, the gaps G1 and G2 between the facing wall faces 43*j* and 43*k* and the side faces 31*e* and 31*f* easily widen. In the vehicle display device pointer 1 of the present embodiment, the light leakage to the dial plate 103 via the gaps G1 and G2 can be suitably suppressed by the protrusions 56 and 57.

In the protrusions 56 and 57 of the vehicle display device pointer 1 of the present embodiment, the outer side faces 56*b* and 57*b* are inclined with respect to the axial direction X toward the same side as the inclination direction of the facing wall faces 43*j* and 43*k*. The outer side faces 56*b* and 57*b* are surfaces on the side opposite to the side of the protrusions 56 and 57 facing the side faces 31*e* and 31*f* of the pointer main body 31. Since the outer side faces 56*b* and 57*b* are inclined toward the same side as the facing wall faces 43*j* and 43*k*, the protrusions 56 and 57 can appropriately close the gaps G1 and G2.

Modified Example of Embodiment

The shape of the pointer 3 is not limited to the shape exemplified in the above embodiment. For example, the cross-sectional shape of the pointer main body 31 may be a shape in which the first side face 31*e* and the second side face 31*f* are parallel to each other. A light-shielding layer may be provided on the back face 31*b* of the pointer main body 31. For example, the light-shielding layer may be formed on the back face 31*b* by a hot stamp or the like. A colored layer may be provided on the back face 31*b* of the pointer main body 31 by a hot stamp or the like.

The shape of the first shielding member 4 is not limited to the shape exemplified in the above embodiment. For example, the first shielding member 4 may not have the second cover 42. In this case, the first shielding member 4 integrally covers the proximal end portion 31*d* of the pointer main body 31 and the light guide 33, for example, by the side walls 43*a*, 43*b*, 43*c*, and 43*d*. That is, the first shielding member 4 may have a substantially rectangular parallelepiped shape as a whole.

The shape and the arrangement of the protrusions 56 and 57 are not limited to the shapes and the arrangements exemplified in the above embodiment. For example, the shapes of the protrusions 56 and 57 are appropriately determined depending on the shapes of the side faces 31*e* and 31*f* of the pointer main body 31 and the shapes of the facing wall faces 43*j* and 43*k*. The protrusions 56 and 57 may be disposed between the side faces 31*e* and 31*f* of the pointer main body 31 and the facing wall faces 43*j* and 43*k*. In other words, the protrusions 56 and 57 may be disposed at positions facing both the side faces 31*e* and 31*f* of the pointer main body 31 and the facing wall faces 43*j* and 43*k* in the second direction W.

The contents disclosed in the above embodiment and modified example can be implemented in combination as appropriate.

The vehicle display device pointer according to the present embodiment includes a translucent pointer that has a pointer main body disposed on a front side of a dial plate with respect to the dial plate having a penetration hole and extending along the dial plate, a shaft protruding toward the penetration hole, and a light guide connecting the pointer main body and the shaft; a lightproof first shielding member that covers a proximal end portion of the pointer main body and the light guide from a front side and a lateral side; and a lightproof second shielding member that covers the proximal end portion of the pointer main body and the light guide from the back side and engages with the first shielding member. The pointer main body emits light by light emitted from a light source disposed on a back side of the dial plate and incident on the shaft. The second shielding member has a protrusion that protrudes toward the front side along an axial direction of the shaft, and closes a gap between the first shielding member and a side face of the pointer main body.

The protrusion can at least close a region near the dial plate, in the gap between the side face of the pointer main body and the first light-shielding member. Therefore, according to the vehicle display device pointer of the present embodiment, there is an effect capable of suppressing light leakage to the dial plate.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device pointer comprising:
    a translucent pointer that has a pointer main body disposed on a front side of a dial plate with respect to the dial plate having a penetration hole and extending along the dial plate, a shaft protruding toward the penetration hole, and a light guide connecting the pointer main body and the shaft;
    a lightproof first shielding member that covers a proximal end portion of the pointer main body and the light guide from a front side and a lateral side; and
    a lightproof second shielding member that covers the proximal end portion of the pointer main body and the light guide from a back side and engages with the first shielding member, wherein
    the pointer main body emits light by light emitted from a light source disposed on a back side of the dial plate and incident on the shaft, and
    the second shielding member has a protrusion that protrudes toward the front side along an axial direction of the shaft, the protrusion closes a gap between the first shielding member and a side face of the pointer main body such that the protrusion blocks a light path that extends from a location inside of the first shielding member to a location outside of the first shielding member, the location inside of the first shielding member is adjacent to the side face of the pointer main body and the location outside of the shielding member is adjacent to the side face of the pointer main body.

2. The vehicle display device pointer according to claim 1, wherein
    a cross-sectional shape of the pointer main body in a cross section orthogonal to an extension direction of the pointer main body is a tapered shape in which a plate thickness becomes thinner toward the back side along the axial direction of the shaft.

3. The vehicle display device pointer according to claim 1, wherein
    the first shielding member has a pair of facing wall faces that are wall faces facing the side face of the pointer main body,
    the facing wall face is inclined with respect to the axial direction of the shaft so that a gap between the pair of facing wall faces widens toward the back side along the axial direction of the shaft, and the protrusion closes a gap between the facing wall face and the side face of the pointer main body.

4. The vehicle display device pointer according to claim 3, wherein
a face of the protrusion on an opposite side of a side facing the side face of the pointer main body is inclined with respect to the axial direction of the shaft toward the same side as an inclination direction of the facing wall face.

5. The vehicle display device pointer according to claim 2, wherein
the side face of the pointer main body is an inclined surface inclined with respect to the axial direction of the shaft,
the protrusion has a facing face that faces the side face of the pointer main body, and
the facing face is inclined with respect to the axial direction of the shaft toward the same side as an inclination direction of the side face of the pointer main body.

6. The vehicle display device pointer according to claim 5, wherein
the first shielding member has a pair of facing wall faces that are wall faces facing the side face of the pointer main body,
the facing wall face is inclined with respect to the axial direction of the shaft so that a gap between the pair of facing wall faces widens toward the back side along the axial direction of the shaft, and
the protrusion closes a gap between the facing wall face and the side face of the pointer main body.

7. The vehicle display device pointer according to claim 6, wherein
a face of the protrusion on an opposite side of a side facing the side face of the pointer main body is inclined with respect to the axial direction of the shaft toward the same side as an inclination direction of the facing wall face.

8. The vehicle display device pointer according to claim 2, wherein
the first shielding member has a pair of facing wall faces that are wall faces facing the side face of the pointer main body,
the facing wall face is inclined with respect to the axial direction of the shaft so that a gap between the pair of facing wall faces widens toward the back side along the axial direction of the shaft and
the protrusion closes a gap between the facing wall face and the side face of the pointer main body.

9. The vehicle display device pointer according to claim 8, wherein
a face of the protrusion on an opposite side of a side facing the side face of the pointer main body is inclined with respect to the axial direction of the shaft toward the same side as an inclination direction of the facing wall face.

* * * * *